United States Patent [19]

Kuwabara

[11] Patent Number: 5,244,247
[45] Date of Patent: Sep. 14, 1993

[54] DOOR INSTALLATION ARRANGEMENT FOR VEHICLE

[75] Inventor: Akira Kuwabara, Kanagawa, Japan

[73] Assignee: Ikeda Bussan Co., Ltd., Ayase, Japan

[21] Appl. No.: 925,186

[22] Filed: Aug. 6, 1992

[30] Foreign Application Priority Data

Aug. 27, 1991 [JP] Japan .............................. 3-075255[U]
Mar. 18, 1992 [JP] Japan .............................. 4-022928[U]

[51] Int. Cl.$^5$ ................................................ B60J 5/00
[52] U.S. Cl. ......................... 296/146.12; 296/146.13; 16/365
[58] Field of Search ................ 296/146 H, 146 I; 49/502; 16/365, 366

[56] References Cited

U.S. PATENT DOCUMENTS

| | | | |
|---|---|---|---|
| 2,743,773 | 5/1956 | Weiertz | 296/146 I |
| 2,993,730 | 7/1961 | Weiertz | 296/146 I |
| 4,653,799 | 3/1987 | Arai et al. | 296/146 H |

Primary Examiner—Robert R. Song
Attorney, Agent, or Firm—Foley & Lardner

[57] ABSTRACT

A door installation arrangement adapted to widely open a door of an automotive vehicle. The door installation arrangement is comprised of a double hinge member which has a first end section hingedly connected to a door body side, and a second end section hingedly connected to a vehicle body side. A hinge trim is disposed separate from the double hinge member to decoratively cover the double hinge member. The hinge trim is hingedly connected at its front end within the vehicle body side through a sub-double hinge member and at its rear end with a door trim through a hinge member.

8 Claims, 5 Drawing Sheets

DOOR INSTALLATION ARRANGEMENT FOR VEHICLE

BACKGROUND OF THE INVENTION

1. Field of the Invention

This invention relates to improvements in a door installation arrangement for an automotive vehicle, and more particularly to such a door installation arrangement of the type using a so-called double hinge member between a vehicle body side and a door body side.

2. Description of the Prior Art

Of a variety of the door installation arrangements through which a door body is pivotally connected to a vehicle body, it has been proposed and put into practical use as shown in FIG. 8 that a door body 1' is connected through a double hinge member 3' with a dash side member 4'. The double hinge member 3' is hingedly connected at its one end section to the front end section of the door body 1' and hingedly connected at the other end thereof to the rear end face of the dash side member 4'. A door trim 2' is attached to the door body 1' on the side of a passenger compartment, and a dash side trim 5' is attached to the dash side member 4' on the passenger compartment side. In such a door installation arrangement, the size of the double hinge member 3' is unavoidably limited because a too large double hinge member affects or interferes with the door trim 2', thereby making impossible to considerably increase the opening degree of the door body.

In view of the above, a door installation arrangement as shown in FIG. 9 has been employed, in which the door body 1' is formed with a depression or groove 1a' for receiving the double hinge member 3'. The double hinge member 3' is hingedly connected at its one end with the door body 1' through a hinge portion 3a', and hingedly connected at the other end with the rear end face of the dash side member 4' through a hinge portion 3b'. Additionally, a hinge trim 6' is securely attached to the double hinge member on the side of a passenger compartment.

With this arrangement, it is necessary to form a space between the hinge trim 6' and the door body 1' by rounding off the end 6a' of the hinge trim 6' in order to prevent an interference of the hinge trim 6' with the door body 1' particularly when the door body 1' is opened to be in parallel with the longitudinal direction of the vehicle body as shown in solid line in FIG. 10. Thus, in the above conventional arrangement, the size of the double hinge member 3' can be increased thereby to allow the opening degree of the door to be enlarged thus facilitating the getting on and off of passengers.

However, difficulties have been encountered in the above conventional arrangement, in which the above-mentioned rounded end 6a' of the hinge trim 6' is in the forefront as a deep groove 6b'. This largely degrades the interior appearance of the door installation arrangement. It is to be noted that it is important to obtain a good interior appearance of the vehicle body in order to raise a commercial value of a product and to improve a comfortableness of the passengers in the vehicle.

SUMMARY OF THE INVENTION

It is an object of the present invention to provide an improved door installation arrangement for a vehicle, which can overcome the difficulties encountered in conventional door installation arrangements.

Another object of the present invention is to provide an improved door installation arrangement for a vehicle, which is high in commercial value and comfortableness of vehicle passengers, facilitating getting on and off of the vehicle passengers.

A further object of the present invention is to provide an improved door installation arrangement for a vehicle, which is high in interior appearance while maintaining a large opening degree of a vehicle door.

A door installation arrangement of the present invention is for a vehicle and comprised of a double hinge member which has a first end section hingedly connected to a door body of the vehicle. A second end section of the double hinge member is hingedly connected to a vehicle body of the vehicle. A hinge trim is movably disposed on an inboard side of and separate from the double hinge member. The hinge trim has first and second end sections. A hinge member is provided such that the first end section of the hinge trim is hingedly connected to a door trim through the hinge member. Additionally, a sub-hinge member is provided such that the second end section of the hinge trim is connected to a member in close proximity to the vehicle body through the sub-hinge.

Accordingly, the hinge trim is disposed separate from the double hinge member and movable independently from the double hinge member. Additionally, the opposite end sections of the hinge trim are respectively connected to the vehicle body side and the door body side through the sub-hinge member and the hinge member. As a result, the hinge trim can move covering the double hinge without an interference with the door trim by virtue of the hinge member, and therefore no groove is formed between the hinge trim and the door trim thereby improving the interior appearance of the door installation arrangement or of the vehicle body. Furthermore, since the sub-hinge member moves following the movement of the door body, the hinge trim can move in accordance with the complicated movement of the door body.

BRIEF DESCRIPTION OF THE DRAWINGS

In the drawings, like reference numerals designate like elements and parts throughout the figures.

DETAILED DESCRIPTION OF THE INVENTION

Figure 1:
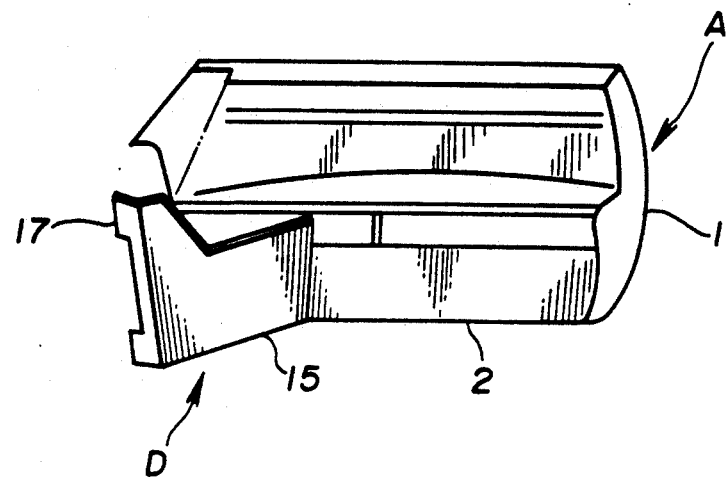
FIG. 1 is a perspective view of a door of an automotive vehicle, provided with an embodiment of a door installation arrangement in accordance with the present invention.
Figure 2:
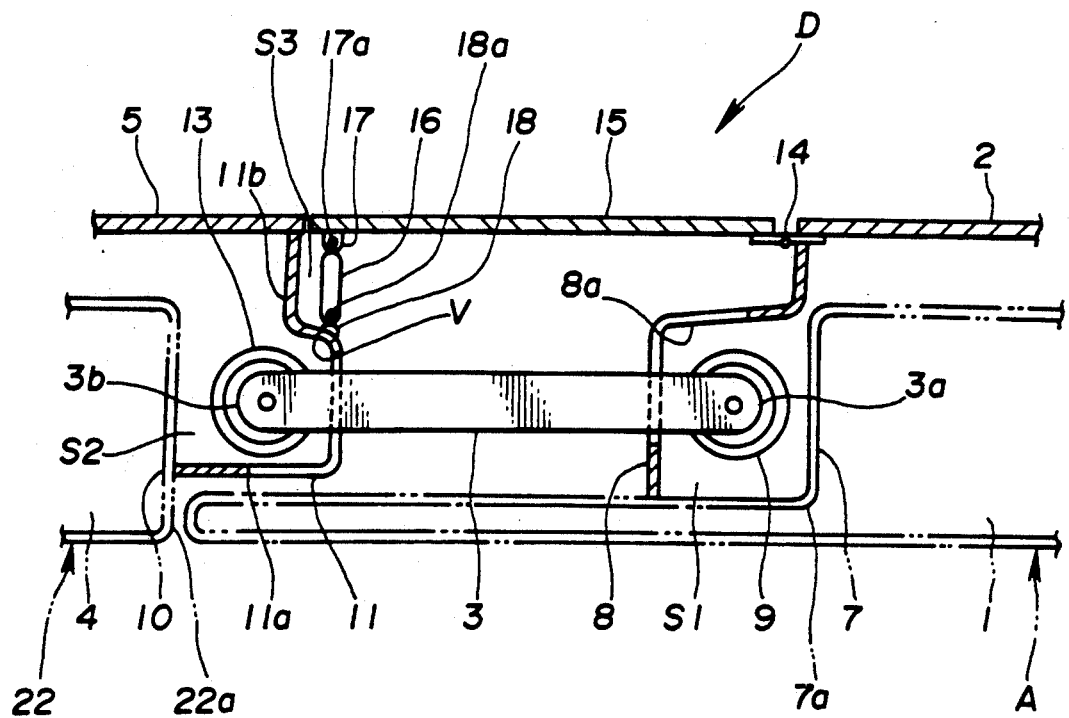
FIG. 2 is a fragmentary sectional view of the door installation arrangement of FIG. 1.

Referring now to FIGS. 1 and 2 of the drawings, an embodiment of a door installation arrangement according to the present invention is illustrated by the reference character D. The door installation arrangement D of this embodiment is for an automotive vehicle including a door A. The door A includes a door body 1 which is mainly constructed of a door panel 7. A frame 8 is fixed to the door panel 7. As shown in FIG. 2, the door panel 7 has a bent section 7a which is formed by bending the door panel 7 generally at right angles. The frame 8 also has a bent section 8a which is formed by bending the frame 8 generally at right angles. A space S1 is formed between the bent sections 7a, 8a of the door panel 7 and the frame 8. An electric motor 9 is disposed in the space S1 and secured to the door body 1.

The door body 1 is arranged to be fittable in a door opening 22a formed in a vehicle body 22. The door body 1 is adapted to be got out of the door opening 22a to keep the door opening 22a open. In this instance, a front part of the door opening 22a is defined by a dash side panel 10 forming part of a dash side 4 of the vehicle body 22. A frame 11 is fixed to the dash side panel 10 and has a bent section 11a which is formed by bending the frame 11 generally at right angles. A space S2 is formed between the bent section 11a of the frame 11 and the dash side panel 10. An electric motor 13 is disposed in the space S2 and secured to the vehicle body 22.

A double hinge member 3 is adapted to connect the vehicle body 22 and the door body 1. More specifically, the double hinge member 3 has one end section 3a mounted on a drive shaft of the motor 9. The other end section 3b of the double hinge member 3 is mounted on a drive shaft of the motor 13. The double hinge member 3 is basically in the form of an elongate link and functions in such a manner that the opposite end sections 3a, 3b respectively serve as hinges.

A door trim 2 is securely attached to the door panel 7 on the side of a passenger compartment (not identified) so that its front end section is connected with tip end of the frame 8. A dash side trim 5 is securely attached to the dash side panel 10 on the passenger compartment side and has a rear end section connected to the tip end of the frame 11. As shown, the frame 11 has a section 11b extending in a direction from the outboard side to the inboard side of the vehicle body 22. The section 11b has a bent portion V which projects forward and has a generally L-shaped cross-section so as to form a space S3. A hinge bracket 18 is disposed in the space S3 and fixedly attached to the bent portion V of the frame 11.

A hinge trim 15 is disposed between the door trim 2 and the dash side panel 5. The rear end section of the hinge trim 15 is hingedly connected to the front end section of the door trim 2 through a hinge member 14. A hinge bracket 17 is fixedly attached to the front end section of the hinge trim 15 on the outboard side. A sub-double hinge member 16 is provided to connect the frame 11 and the hinge trim 15. More specifically, the sub-double hinge member 16 has one end section (no numeral) hingedly connected through a hinge pin 17a with the hinge bracket 17 and the other end section (no numeral) hingedly connected through a hinge pin 18a with the hinge bracket 18. Thus, the opposite end sections of the sub-double hinge member serve respectively as hinges. It will be seen that the door trim 2, the hinge trim 15 and the dash side panel 5 are arranged to be generally in flush with each other in a condition in which the door A is closed as shown in FIG. 2.

Figure 3:
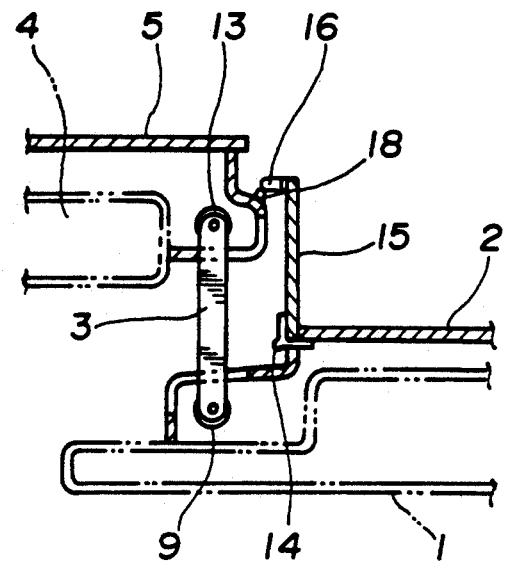
FIG. 3 is a fragmentary sectional view similar to FIG. 2 but showing an operational mode of the door installation arrangement of FIG. 1.

The manner of operation of the thus arranged door installation arrangement D will be discussed with reference to FIGS. 3 and 4.

First, when the door A is to be opened so as to be brought into parallel with the longitudinal direction of the vehicle body 22, the motor 13 is driven so that the double hinge member 3 is rotated clockwise in the figures around the axis of the drive shaft of the motor 13. Accordingly, the door body 1 rotates counterclockwise in the figures relative to the double hinge member 3 around the axis of the drive shaft of the motor 9 and reaches a position to be parallel with the longitudinal direction of the vehicle body 22 as shown in FIG. 3. At this time, the hinge trim 15 moves following the movement of the door body 1 in which the hinge member 14 is in a closed condition. Additionally, the sub-double hinge member 16 rotates around the hinge pin 18a at the hinge bracket 18 following the movement of the hinge trim 15 without changing the angle relative to the hinge trim 15.

Figure 4:
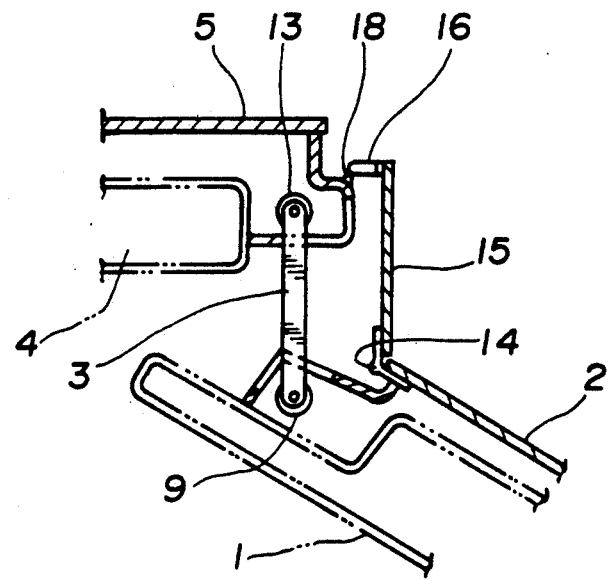
FIG. 4 is a fragmentary sectional view similar to FIG. 2 but showing another operational mode of the door installation arrangement of FIG. 1.

When the door A is to be further opened, the door body 1 is rotated clockwise in the figures around the axis of the drive shaft of the motor 9 and reaches a position shown in FIG. 4. At this time, the hinge member 14 of the hinge trim 15 is opened while the sub-double hinge member 16 rotates around the hinge pins 17a, 18a of the hinge brackets 17, 18 following the movement of the hinge trim 15 in which the angle of the sub-double hinge member 16 to the hinge trim 15 increases. In the condition of FIG. 4, a broad space is formed between the vehicle body 22 and the door A, and therefore getting on and off of passengers are facilitated.

As apparent from the above, since the hinge trim 15 is rotated without making an interference with the door trim 2 under the action of the hinge member 14, no groove or the like is formed between the hinge trim 15 and the door trim 2 thereby improving the interior appearance of the vehicle. Furthermore, the sub-double hinge member 16 rotates following the movement of the door body 1, and therefore the hinge trim 15 can be smoothly moved in accordance with the complicated movement of the door body 1 thereby ensuring the broad space between the vehicle body 22 and the door B.

Figure 5:
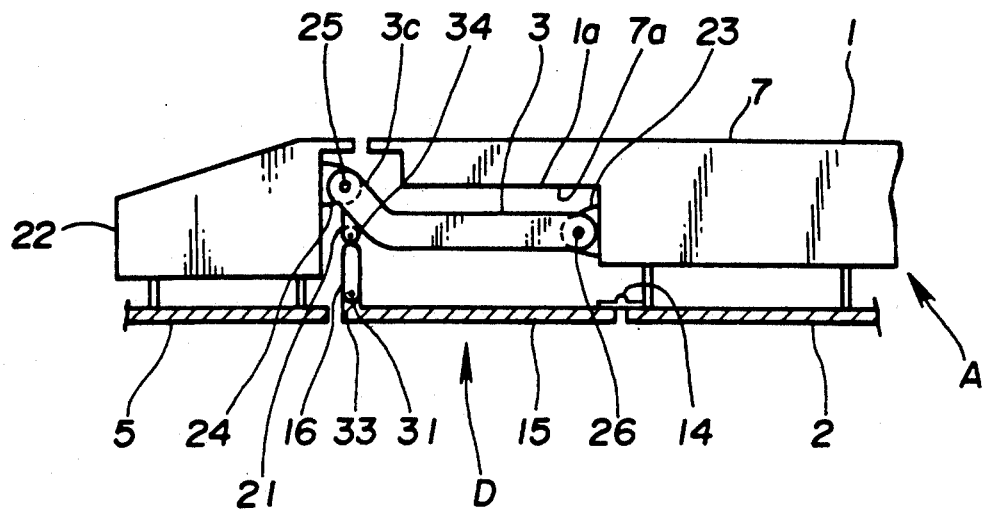
FIG. 5 is a schematic fragmentary sectional view of another embodiment of the door installation arrangement in accordance with the present invention.
Figure 6:
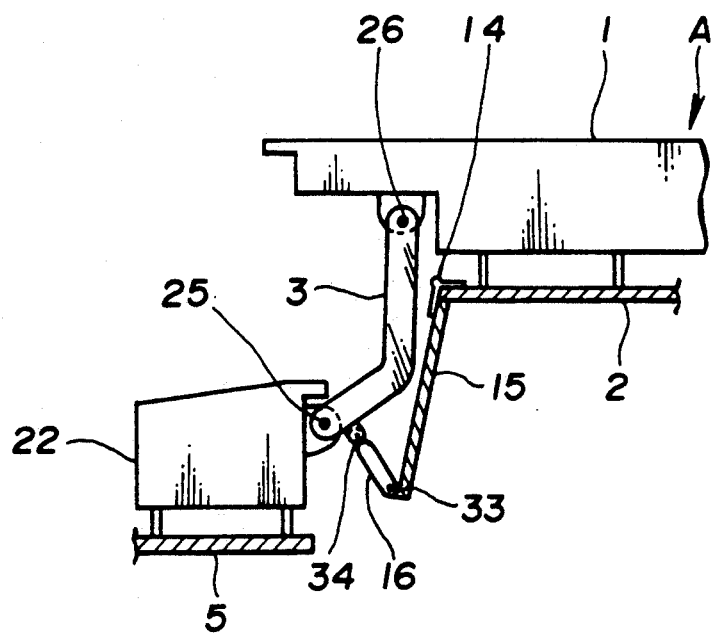
FIG. 6 is a schematic fragmentary sectional view similar to FIG. 5 but showing an operational mode of the door installation arrangement of FIG. 5.
Figure 7:
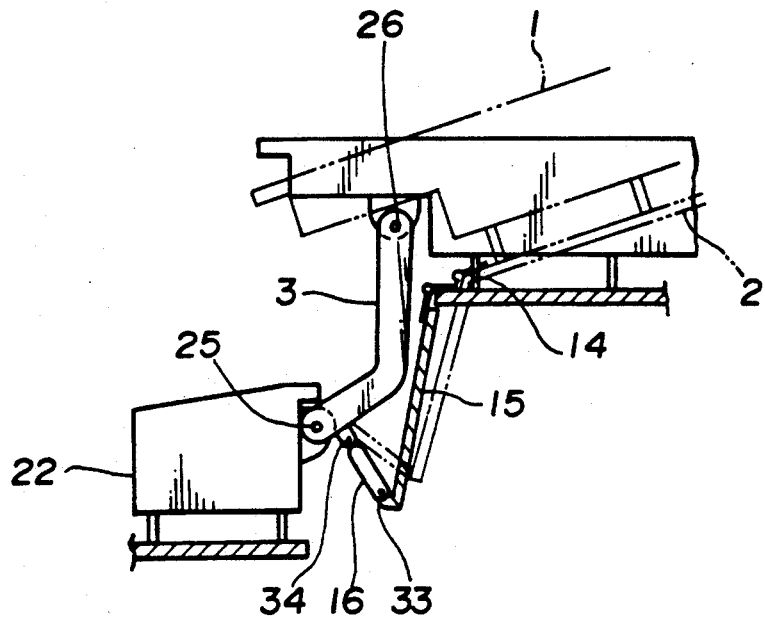
FIG. 7 is a schematic fragmentary sectional view similar to FIG. 5 but showing another operational mode of the door installation arrangement of FIG. 5.
Figure 8:
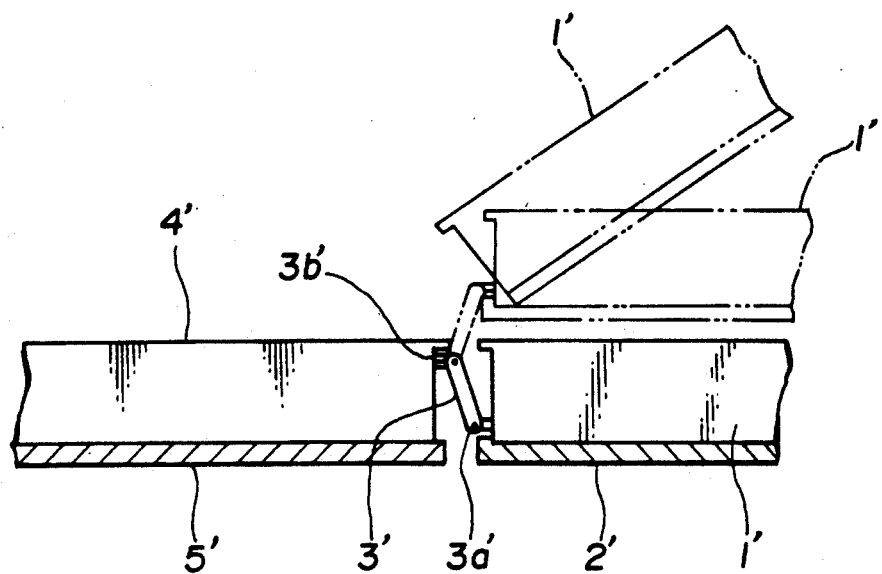
FIG. 8 is a schematic fragmentary sectional view of a conventional door installation arrangement.
Figure 9:
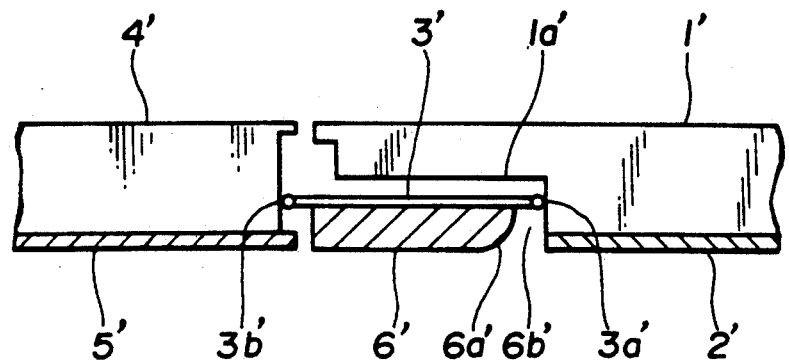
FIG. 9 is a schematic fragmentary sectional view of another conventional door installation arrangement.
Figure 10:
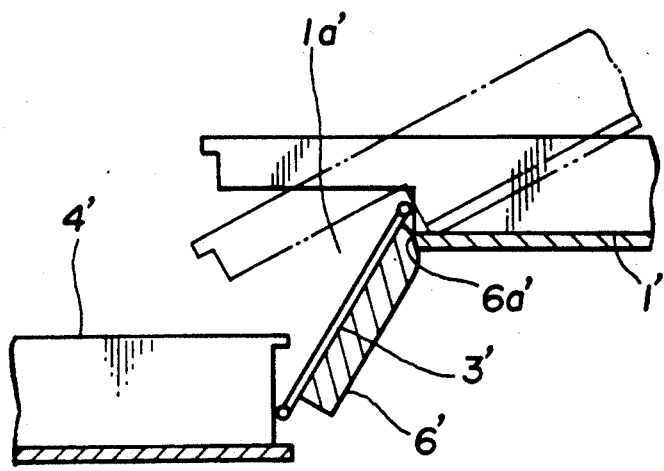
FIG. 10 is a schematic fragmentary sectional view similar to FIG. 9 but showing an operational mode of the door installation arrangement of FIG. 9.

FIGS. 5 to 7 illustrate another embodiment of the door installation arrangement D in accordance with the present invention, which is similar to the embodiment of FIGS. 1 to 4.

In this embodiment, the double hinge member 3 is provided to connect the vehicle body 22 and the door body 1. More specifically, the front end section of the double hinge member 3 is hingedly connected through a hinge pin 26 with a hinge bracket 23 fixed to the door body 1. The hinge bracket 23 is located on the bent section 7a of the door panel 7 defining a depressed part 1a. The rear end section of the double hinge member 3 is hingedly connected through a hinge pin 25 with a hinge bracket 24 fixed to the vehicle body 22.

As shown, the double hinge member 3 is outwardly bent at its end section connected to the hinge bracket 24 to form a bent portion 3c. A hinge bracket 21 is fixedly secured to the bent portion 3c of the double hinge member 3 and projects in the outboard to inboard direction.

The dash side trim 5 is fixedly attached to the vehicle body 22 at the passenger compartment side. The door trim 2 is fixedly attached to the door body 1 on the passenger compartment side. The hinge trim 15 is hingedly connected through the hinge member 14 with the front end section of the door trim 2. A hinge bracket 31 is fixedly secured to the front end section of the hinge trim 15 at the outboard side. The sub-double hinge member 16 is hingedly connected at its inboard end section with the hinge bracket 31 through a hinge pin 33, and at its outboard end section with the hinge bracket 21 connected to the double hinge member 3.

In operation, first when the door A is to be opened so as to be brought into parallel with the longitudinal direction of the vehicle body 22, the double hinge 3 rotates around the hinge pin 26 at the front end section of the double hinge member 3, while the door body 1 rotates in the inboard direction relative to the double hinge member 3 around the hinge pin 26 at the rear end section of the double hinge member 34, so that the door body 1 reaches a position to be parallel with the longitudinal direction of the vehicle body 22 as shown in FIG. 6. At this time, the hinge trim 15 moves following the movement of the door body 1 in which the hinge member 15 is closed. Simultaneously, the sub-double hinge member 16 rotates around the hinge pin 34 following the movement of the hinge trim 15 in which the angle of the sub-double hinge 16 to the hinge trim 15 changes.

Next, when the door A is to be further opened, the door body 1 is rotated outwardly around the hinge pin 26 of the double hinge member 3 and reaches a position as shown in FIG. 7. At this time, the hinge member 14 of the hinge trim 15 is opened while the sub-double hinge member 16 rotates around the hinge pins 33, 34 following the movement of the hinge trim 15 so that the angle of the sub-double hinge 15 relative to the hinge trim 15 is increasing. At this position of the door body 1, a broad space is formed between the vehicle body 22 and the door A thereby facilitating getting on or off of the passengers.

Also in this embodiment, since the hinge trim 15 is rotated without making an interference with the door trim 2 under the action of the hinge member 14, no groove or the like is formed between the hinge trim 15 and the door trim 2 thereby improving the interior appearance of the vehicle. Furthermore, the sub-double hinge member 16 rotates following the movement of the door body 1, and therefore the hinge trim 15 can be smoothly moved in accordance with the complicated movement of the door body 1 thereby ensuring the broad space between the vehicle body 22 and the door A.

What is claimed is:

1. A door installation arrangement for a vehicle, comprising:
    a double hinge member having a first end section hingedly connected to a door body of the vehicle, and a second end section hingedly connected to a vehicle body of the vehicle;
    a hinge trim movably disposed on an inboard side of and separate from said double hinge member, said hinge trim having first and second end sections;
    a hinge member through which said first end section of said hinge trim is hingedly connected to a door trim; and
    a sub-hinge member through which said second end section of said hinge trim is connected to a member in close proximity to said vehicle body.

2. A door installation arrangement as claimed in claim 1, wherein said second end section of said hinge trim is hingedly connected to said vehicle body.

3. A door installation arrangement as claimed in claim 1, wherein said second end section of said hinge trim is indirectly connected to said vehicle body.

4. A door installation arrangement as claimed in claim 3, wherein said second end section of said hinge trim is hingedly connected with said second end section of said double hinge member.

5. A door installation arrangement as claimed in claim 1, wherein said double hinge member has a first axis at said first end section, and a second axis at said second end section, said double hinge member being rotatable around each of said first and second axes.

6. A door installation arrangement as claimed in claim 5, wherein said first axis is that of a drive shaft of a first motor fixedly connected to said door body, and said second axis is that of a drive shaft of a second motor fixedly connected to said vehicle body.

7. A door installation arrangement as claimed in claim 5, wherein said first axis is that of a first hinge pin connected to said door body, and said second axis is that of a second hinge pin connected to said vehicle body.

8. A door installation arrangement as claimed in claim 1, wherein said sub-hinge member is a sub-double hinge member which has a first end section at which a third hinge pin is disposed and connected to said hinge trim, and a second end section at which a fourth hinge pin is disposed and connected to said member in close proximity to said vehicle body, said sub-double hinge being rotatable around an axis of each of said third and fourth hinge pins.

* * * * *